Nov. 11, 1969  F. A. BUUCK ET AL  3,478,349
STATOR ASSEMBLY FOR ELECTROMAGNETIC INDICATING APPARATUS
Filed April 12, 1968  7 Sheets-Sheet 1

INVENTORS:
FREDERICK A. BUUCK,
PHILLIP L. HARDEN,
SAMUEL M. THOMAS, JR.
BY
ATTORNEYS.

Nov. 11, 1969    F. A. BUUCK ET AL    3,478,349
STATOR ASSEMBLY FOR ELECTROMAGNETIC INDICATING APPARATUS
Filed April 12, 1968    7 Sheets-Sheet 2
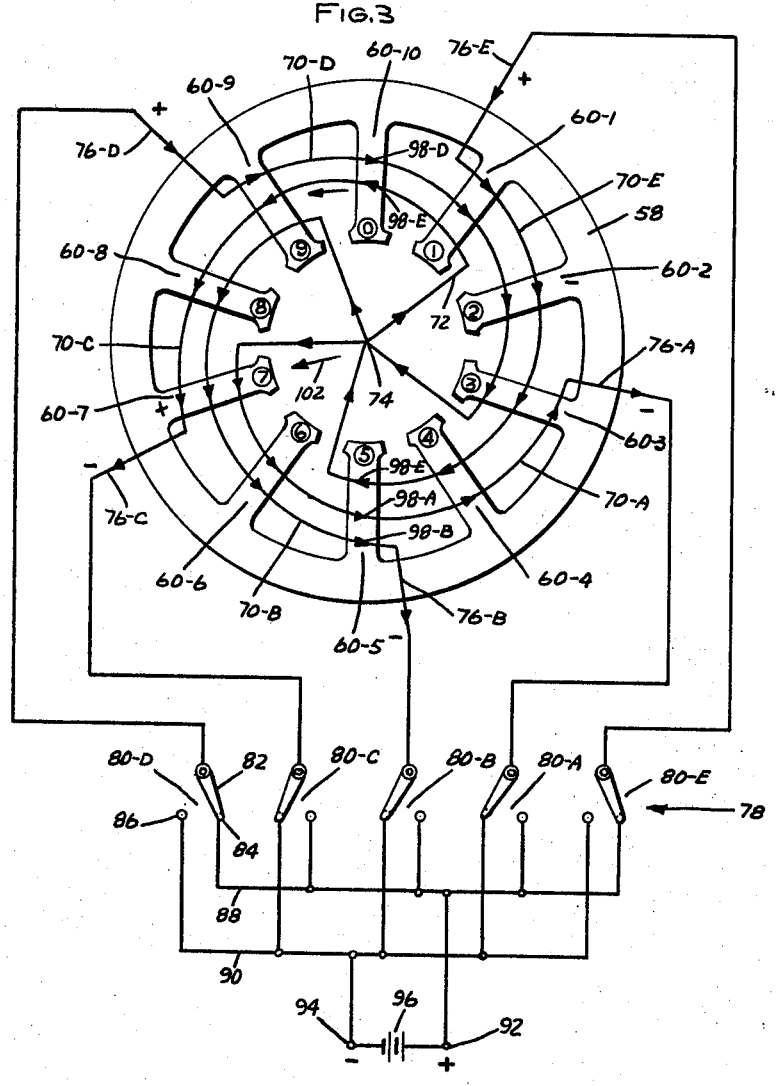
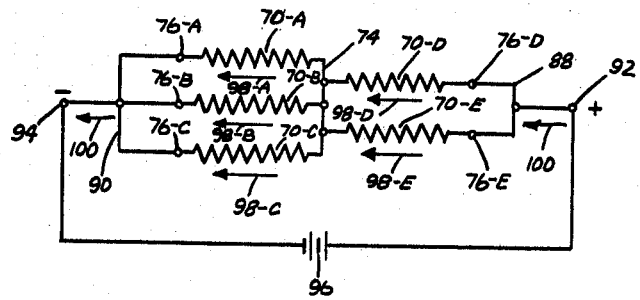
INVENTORS:
FREDERICK L. BUUCK,
PHILLIP L. HARDEN,
SAMUEL M. THOMAS, JR.
BY Hood, Gust, Irish & Lundy
ATTORNEYS.

Nov. 11, 1969    F. A. BUUCK ET AL    3,478,349
STATOR ASSEMBLY FOR ELECTROMAGNETIC INDICATING APPARATUS
Filed April 12, 1968                   7 Sheets-Sheet 3
FIG.5
| READ OUT | COIL | | | | |
|---|---|---|---|---|---|
| | A | B | C | D | E |
| 0 | + | + | − | − | + |
| 1 | + | + | − | − | − |
| 2 | + | + | + | − | − |
| 3 | − | + | + | − | − |
| 4 | − | + | + | + | − |
| 5 | − | − | + | + | − |
| 6 | − | − | + | + | + |
| 7 | − | − | − | + | + |
| 8 | + | − | − | + | + |
| 9 | + | − | − | − | + |
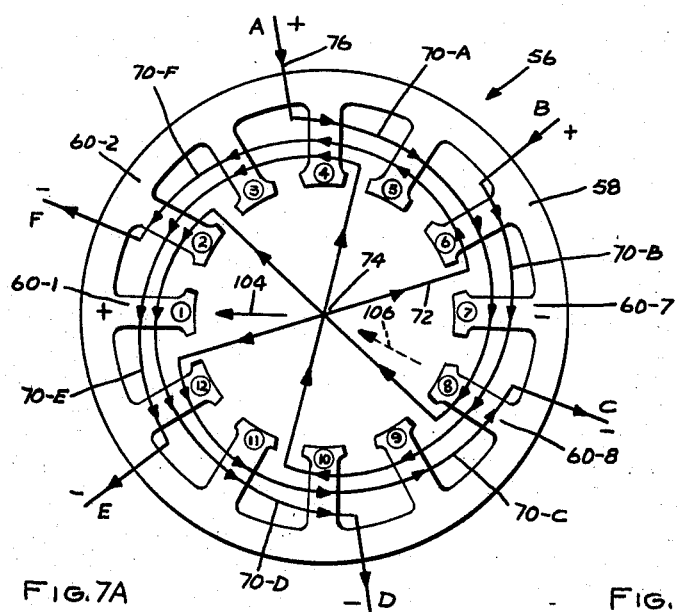
FIG.6
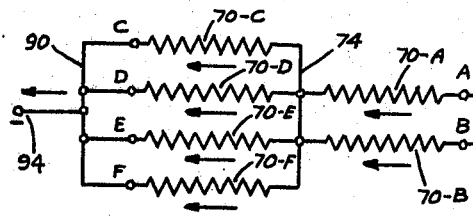
FIG.7A
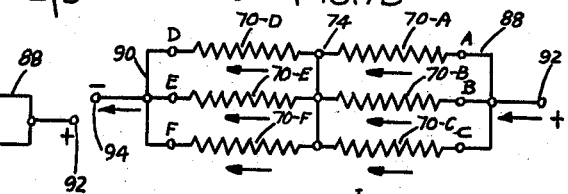
FIG.7B
INVENTORS:
FREDERICK A. BUUCK,
PHILLIP L. HARDEN,
SAMUEL M. THOMAS, JR.
BY Hood, Gust, Irish & Lundy
ATTORNEYS

| READ OUT | COIL | | | | | |
|---|---|---|---|---|---|---|
| | A | B | C | D | E | F |
| 1 | + | + | − | − | − | − |
| 2 | + | + | + | − | − | − |
| 3 | − | + | + | − | − | − |
| 4 | − | + | + | + | − | − |
| 5 | − | − | + | + | − | − |
| 6 | − | − | + | + | + | − |
| 7 | − | − | − | + | + | − |
| 8 | − | − | − | + | + | + |
| 9 | − | − | − | − | + | + |
| 10 | + | − | − | − | + | + |
| 11 | + | − | − | − | − | + |
| 12 | + | + | − | − | − | + |

INVENTORS:
FREDERICK A. BUUCK,
PHILLIP L. HARDEN,
SAMUEL M. THOMAS, JR,
BY
ATTORNEYS.

Nov. 11, 1969 F. A. BUUCK ET AL 3,478,349
STATOR ASSEMBLY FOR ELECTROMAGNETIC INDICATING APPARATUS
Filed April 12, 1968 7 Sheets-Sheet 5

| READ OUT | COIL | | | | |
|---|---|---|---|---|---|
| | A | B | C | D | E |
| 0 | + | + | − | − | − |
| 1 | + | + | − | − | − |
| 2 | + | + | + | − | − |
| 3 | − | + | + | − | − |
| 4 | − | + | + | + | − |
| 5 | − | − | + | + | − |
| 6 | − | − | + | + | + |
| 7 | − | − | − | + | + |
| 8 | + | − | − | + | + |
| 9 | + | − | − | − | + |

INVENTORS:
FREDERICK A. BUUCK,
PHILLIP L. HARDEN,
SAMUEL M. THOMAS, JR.
BY
ATTORNEYS.

| READ OUT | COIL | | | | |
|---|---|---|---|---|---|
| | A | B | C | D | E |
| 0 | + | − | + | − | + |
| 1 | − | − | + | − | + |
| 2 | − | + | + | − | + |
| 3 | − | + | − | − | + |
| 4 | − | + | − | + | + |
| 5 | − | + | − | + | − |
| 6 | + | + | − | + | − |
| 7 | + | − | − | + | − |
| 8 | + | − | + | + | − |
| 9 | + | − | + | − | − |

| READ OUT | COIL | | | | | |
|---|---|---|---|---|---|---|
| | A | B | C | D | E | F |
| 1 | − | − | + | − | + | − |
| 2 | − | + | + | − | + | − |
| 3 | − | + | − | − | + | − |
| 4 | − | + | − | + | + | − |
| 5 | − | + | − | + | − | − |
| 6 | − | + | − | + | − | + |
| 7 | + | + | − | + | − | + |
| 8 | + | − | − | + | − | + |
| 9 | + | − | + | + | − | + |
| 10 | + | − | + | − | − | + |
| 11 | + | − | + | − | + | + |
| 12 | + | − | + | − | + | − |

INVENTORS:
FREDERICK A. BUUCK,
PHILLIP L. HARDEN,
SAMUEL M. THOMAS, JR,
BY Wood, Just, Irish & Lundy
ATTORNEYS

United States Patent Office 3,478,349
Patented Nov. 11, 1969

3,478,349
STATOR ASSEMBLY FOR ELECTROMAGNETIC
INDICATING APPARATUS
Frederick A. Buuck, Phillip L. Harden, and Samuel M. Thomas, Jr., Fort Wayne, Ind., assignors to Bowmar Instrument Corporation, Fort Wayne, Ind., a corporation of Indiana
Filed Apr. 12, 1968, Ser. No. 720,878
Int. Cl. H04l 3/00; G08b 5/00; H03k 13/00
U.S. Cl. 340—347
17 Claims

ABSTRACT OF THE DISCLOSURE

Electromagnetic indicating apparatus for displaying a predetermined even number of discrete indicia in response to the characters of a prearranged code having a magnetic stator core structure and a radially polarized permanent magnet rotor member. The stator structure comprises a yoke portion having at least the same number of polar projections or teeth extending radially inwardly, the projections being equally angularly spaced around the yoke portion and having radially inner ends which define a bore for receiving the permanent magnet rotor member which is mounted for rotation on an axis concentric with the bore. A plurality of substantially identical field winding sections are provided equal in number to one-half the same even number, the winding sections being positioned on the core structure in angularly displaced relationship and having first ends which are interconnected. A pair of electrical leads are provided for connection respectively to the opposite polarity sides of a source of direct current potential. Switching means is provided having the same even number of positions for selectively coupling in each of its positions the other ends of at least two predetermined different ones of the winding sections to one of the leads and the other ends of the remaining winding sections to the other of the leads for simultaneous energization of all of the winding sections with polarities in accordance with the code, there being at least two of the remaining winding sections in each position of the switching means. Thus, the predetermined different two of the winding sections have current flow therein in one predetermined direction and generate MMF's of one predetermined polarity in the core structure, and the remaining winding sections have current flow therein in the opposite direction and generate MMF's of the opposite polarity in the core structure in each position of the switching means thereby providing equal MMF values of opposite polarity in a different pair of diametrically opposite polar projections in each of the switching means positions so as to provide the same even number of discrete magnetic orientations for the rotor member.

BACKGROUND OF THE INVENTION

Field of the invention

This invention relates generally to electromagnetic indicating apparatus of the rotary magnetic position indicating type for displaying discrete indicia in response to the characters of a prearranged code, and more particularly to an improved magnetic stator assembly for such apparatus.

Description of the prior art

Numerous types of electromagnetic rotary position indicator devices have been proposed. Typical are those disclosed in Patent Number 3,371,333 to Arthur F. Naylor, and assigned to the assignee of the present application, 3,311,911 to Leonard C. Pursiano et al., 3,289,199 to J. A. Watkins, 3,218,625 to A. E. Knotowicz, 3,113,-301 to F. C. Templin and 2,943,313 to B. N. Gordon et al., and in IBM Technical Disclosure Bulletin, volume 2, number 2, page 7, August 1959. All of these devices employ a magnetic stator structure having a plurality of windings and a radially polarized permanent magnetic rotor member, the windings being variously energized in accordance with a prearranged code so as selectively to position the permanent magnet rotor in a plurality of discrete rotational positions. The device of the IBM Technical Disclosure Bulletin employed five windings to provide ten positions, predetermined groups of two of the five winding being energized with one polarity with vector addition of the resultant MMF's thus providing ten discrete rotational positions of the rotor member. The Watkins, Knotowicz and Templin patents each disclosed electromagnetic indicators with one or more field windings selectively energized to provide ten or twelve discrete rotational positions of the permanent magnet rotor member, some of the positions requiring partial cancellation of the MMF's produced by one or more of the windings. The Naylor and Pursiano et al. patents both disclose devices in which various combinations of field windings are selectively energized with a positive or negative potential to provide the plurality of discrete rotational positions of the rotor member. The Gordon et al. patent discloses a device employing field winding coils equal in number to the number of positions with all of the coils being selectively energized in a parallel circuit.

The prior electromagnetic indicators known to the present applicants thus fall in two general categories, i.e., those which rely on energization of various combinations of one or more field windings for each different position and which thus have a varying current consumption, some of these also utilizing MMF cancellation in some of the positions with consequent reduction in efficiency, and those which while energizing all of the field windings in each position with resultant constant current consumption, require as many external leads and thus code inputs as there are rotational positions.

Electromagnetic indicator devices are most commonly employed for computer readout and it is thus desirable to reduce the computer interface by providing an indicator having the capability of selecting any one of the desired number of discrete indicating positions with a minimum number of input connections. It is further desirable that the interface and code conversion electronics be reduced by employing only two-state switching, i.e., with all input leads to the indicator being either at a source potential or at ground potential. It may be further desirable that the current consumption of the indicator be constant for any valid input code. Finally, it is highly desirable that the indicator operate at high efficiency with a consequent high reliability thus permitting a minimum input power level with resultant reduction in drain on the system power supply and reduction in the heat required to be dissipated by the indicator.

It is thus desirable to provide an electromagnetic indicator in which all of the field windings are energized in all of the positions of the device thus providing minimum current consumption and maximum efficiency, and in which only two-state switching is required with a number of external leads fewer than the number of indicator positions.

SUMMARY OF THE INVENTION

The invention, in its broader aspects, provides a magnetic stator assembly for electromagnetic indicating apparatus for displaying a predetermined even number of discrete indicia in response to the characters of a prearranged code. The assembly comprises a magnetic stator core structure having a yoke portion with at least the same number of polar projections extending radially inwardly therefrom, the projections being equally angularly spaced around the yoke portion and having radially inner ends defining a bore for receiving a radially polarized permanent magnet rotor member. A plurality of substantially identical field winding sections is provided equal in number to one-half the even number and each having first and second ends, the winding sections being positioned on the core structure in angularly displaced relationship and the first ends of all the winding sections being interconnected. A pair of electrical leads is provided for connection respectively to the opposite polarity sides of a source of direct current potential, and switching means is provided having the even number of positions for selectively coupling in each of its positions the second ends of at least two predetermined different ones of the winding sections to one of the leads and the second ends of the remaining winding sections to the other of the leads for simultaneous energization of all of the winding sections with polarities in accordance with the code, there being at least two of the remaining winding sections in each position of the switching means.

It is accordingly an object of the invention to provide an improved magnetic stator assembly for electromagnetic indicating apparatus.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 3 is a schematic view of the indicator of FIGS. 1 and 2 together with the switching system therefor;

FIG. 4 shows the equivalent circuit for one of the switching positions of FIG. 3;

FIG. 5 is a chart showing a code employed with the indicator system shown in FIG. 3 for ten rotor positions;

FIG. 6 is a schematic diagram showing an indicator similar to that shown in FIGS. 1 through 5, but employing six winding sections and providing twelve indicator positions;

FIGS. 7A and 7B show the equivalent circuits for two of the positions of the indicator shown in FIG. 6;

DESCRIPTION OF THE PREFERRED EMBODIMENTS

Figure 1:
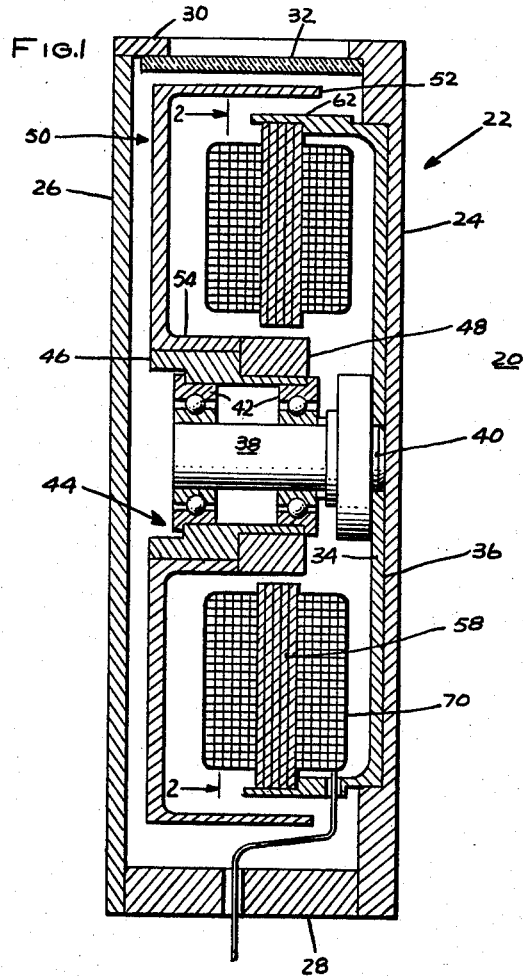
FIG. 1 is a side cross-sectional view showing one embodiment of the invention.

Referring now to FIGS. 1 through 5, inclusive, there is shown an electromagnetic indicator device, generally indicated at 20 for displaying ten discrete indicia, such as the numerals zero through nine, in response to the characters of a prearranged code. The indicator 20 comprises the housing 22 having spaced-apart side-walls 24 and 26, a bottom wall 28, and a top wall 30, having a window 32 therein for viewing the indicia which are displayed.

An annular cup-shaped member 34 which may be formed of suitable magnetic material is provided seated in a recess 36 formed in the inner surface of the side wall 24. A stationary shaft 38 is provided having an end 40 seated in an opening formed in the cup-shaped member 34 and secured thereto. A pair of suitable antifriction bearings 42 are positioned on the stationary shaft 38 and rotatably support the rotor assembly 44 thereon.

Rotor assembly 44 comprises an annular sleeve member 46 mounted on the bearings 42 and having the annular permanent magnet rotor member 48 secured thereto. Indicator drum 50 is provided having an outer cylindrical portion 52 and an inner annular flange portion 54 mounted on the sleeve member 46, permanent magnet 48, sleeve member 46 and the indicator drum 50 thus rotating as a unit on the bearings 42. The outer peripheral surface of the cylindrical portion 52 carries the indicia which are viewed through the window 32.

A stator core structure 56 is provided conventionally formed of a plurality of relatively thin laminations of magnetic material. Stator core structure 56 comprises an annular yoke portion 58 having a plurality of equally angularly spaced polar projections or teeth 60 extending radially inwardly therefrom. The stator core structure 56 is mounted in annular flange portion 62 of the cup-shaped member 34 which may form a magnetic return path. The inner ends 64 of the polar projections 60 define a bore for receiving the permanent magnet rotor member 48.

In the preferred embodiment of this invention, the permanent magnet rotor member 48 is of the type described and illustrated in application Ser. No. 451,812 of Arthur F. Ordas, and assigned to the assignee of the present application. Thus, permanent magnet rotor member 48 is provided with a pair of diametrically opposite projections 66 respectively angularly displaced from the magnetic and grain axis of the permanent magnet, as indicated by the dashed line 68. It will be observed that the projections 66 define smaller air gaps with the inner ends of a respective diametrically opposite pair of stator teeth 60 than are defined by the inner ends of the remaining teeth with the remaining portions of the peripheral surface of the permanent magnet 48. Thus, when the field windings are energized, as will be hereinafter described, by reason of the lower reluctance provided by the smaller air gaps, the projections 66 will align themselves with a respective diametrically opposite pair of stator teeth 60. However, when the field excitation is removed, as further described in the aforesaid Ordas application, the rotor member 48 will rotate slightly so that its axis 68 is aligned with the same diametrically opposite pair of stator teeth, thus permitting a subsequent 180° reversal of the permanent magnet rotor member 48.

Figure 2:
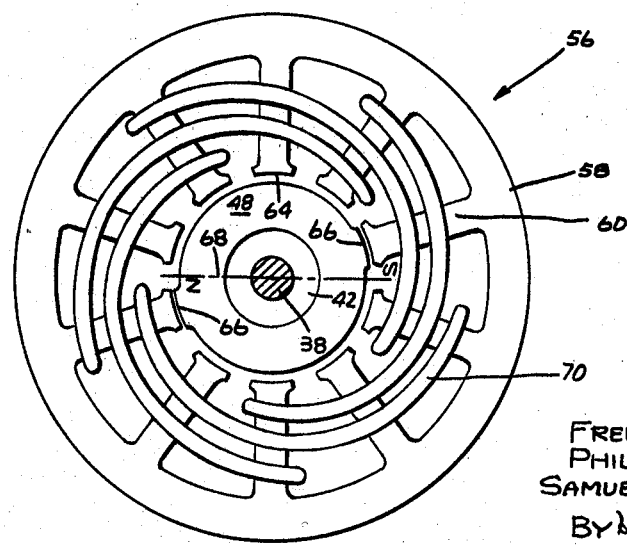
FIG. 2 is a fragmentary cross-sectional view taken generally along the line 2—2 of FIG. 1.

In this embodiment in which ten discrete rotational positions of the rotor member 48 are provided, the stator structure 58 has ten teeth or polar projections 60 and five field winding sections positioned thereon. Each of the field winding sections comprises a single coil 70 which spans five of the stator teeth 60, the coils 70 being equally angularly displaced around the stator teeth 60 in symmetrical relationship, as shown in FIG. 2. As will be hereinafter more fully described, with corresponding ends of each of the coils 70 interconnected, selective connection of the other ends of a predetermined two of the coils to one polarity of the source of direct current potential, and simultaneous connection of the other ends of the remaining coils to the opposite polarity will establish a resultant MMF in the stator structure 58, in turn providing a corresponding discrete rotational orientation for the rotor member 48.

Referring now particularly to FIG. 3, it will be seen that the winding section or coil 70–A spans stator teeth 60–3, 60–4, 60–5, 60–6, and 60–7; that the coil 70–B spans the stator teeth 60–5, 60–6, 60–7, 60–8, and 60–9; that the coil 70–C spans stator teeth 60–7, 60–8, 60–9, 60–10, and 60–1; that the coil 70–D spans stator teeth 60–9, 60–10, 60–1, 60–2, and 60–3; and that the coil 70–E spans stator teeth 60–1, 60–2, 60–3, 60–4, and 60–5. The coils 70 are substantially identical, i.e each has substantially the same number of turns of the same wire size thus having substantially the same resistance and are positioned on the stator teeth 60 in the same sense, i.e. so that current flow therein in the same direction will result in generation of an MMF of the same polarity in the core structure 58.

The inner ends 72 of each of the field winding sections or coils 70 are interconnected, as at 74, and the outer ends 76 are brought out for making external switching connections thereto, as indicated at A, B, C, D, and E.

A switching system 78 is provided, shown schematically in FIG. 3 as comprising five single pole, double-throw switches 80–A, 80–B, 80–C, 80–D, and 80–E. The movable contacts 82 of the switches 80 are respectively connected to the outer ends 76 of the coils 70 while the two stationary contacts 84 and 86 of the switches 80 are respectively coupled by common connections 88 and 90 to positive and negative polarity terminals 92 and 94 which, in turn, are adapted to be connected to the positive and negative polarity sides of a suitable source of direct current potential, shown here as being a battery 96. It will be readily understood that the switching system 78 may comprise conventional static switching devices, flip-flops, a switching matrix, or the like, as is well known to those skilled in the art.

In accordance with the invention, ten different switching positions for the switches 80 are provided and in each switch position, the outer ends 76 of a predetermined different two of the coils 70 are connected to one of the terminals 92, 94, and thus to one polarity side of the battery 96, and the outer ends 76 of the remaining three coils 70 are connected to the other terminal and thus to the other polarity side of the battery. It will thus be seen that ten different switching positions are provided by the switches 80, different combinations of two of the coils 70 being connected to the positive side of the battery 96 in five of the switch positions and to the negative side in the remaining five of the switch positions. It will further be seen that all of the coils 70 are connected for energization in each of the switch positions.

In FIG. 3, switches 80–D and 80–E are shown positioned to connect the outer ends 76–D and 76–E of the coils 70–D and 70–E respectively to the positive terminal 92, and switches 80–A, 80–B and 80–C are shown positioned to connect the outer ends 76–A, 76–B, and 76–C of the coils 70–A, 70–B and 70–C to the negative terminal 94. This will provide the series-parallel circuit shown in FIG. 4 in which coils 70–D and 70–E are connected in parallel and in turn connected in series with the parallel-connected coils 70–A, 70–B and 70–C. It will further be seen that the sum of the currents flowing in the coils 70–D and 70–E, as indicated by the arrows 98–D and 98–E, will be equal to the sum of the currents respectively flowing in the coils 70–A, 70–B, and 70–C as shown by the arrows 98–A, 98–B and 98–C.

It will further be readily apparent in each of the ten positions of the switches 80, the same condition will prevail, i.e., that the sum of the currents flowing in the predetermined different two coils which are connected to one polarity side of the source will be equal to the sum of the currents flowing in the remaining three coils which are simultaneously connected to the other polarity side of the source, so that the current flow in the system, as shown by the arrows 100, is constant for each of the ten switch positions.

It will now be observed by reference to FIG. 3 that in the switch positions shown, the MMF's generated in the core structure 58 will be equal and opposite only in the diametrically opposite pair of teeth or polar projections 60–2 and 60–7, thus causing the projections 66 on the permanent magnet rotor member 48 respectively adjacent the north and south poles (FIG. 2) respectively to align themselves with the teeth 60–7 and 60–2, as shown by the arrow 102.

Referring now briefly to FIG. 5, a code is shown for operation of the switching system 78 in order to provide the ten different discrete positions of the permanent magnet rotor member 48. It will be readily understood that the read-out digits zero through nine are displayed in sequence upon the outer peripheral surface of the cylindrical portions 52 of the display drum 50. Reference again to FIGS. 3 and 4 will show that with the switches 80 of the switching system 78 positioned as shown, i.e., with the A, B, and C coils coupled to the negative side of the source 96 and the D and E coils connected to the positive side, the permanent magnet rotor member 48 will be positioned to display the numeral 7. Inspection of FIG. 5 in conjunction with FIGS. 3 and 4 will likewise reveal that in each of the remaining nine positions of the switches 80 of the switching system 78, in each of which a predetermined different two of the coils is connected to one polarity side of the source 96 and the remaining three to the other polarity side, a different discrete magnetic orientation of the permananet magnet rotor member 48 will be provided, in turn displaying the respective numeral.

Figures 8, 9:
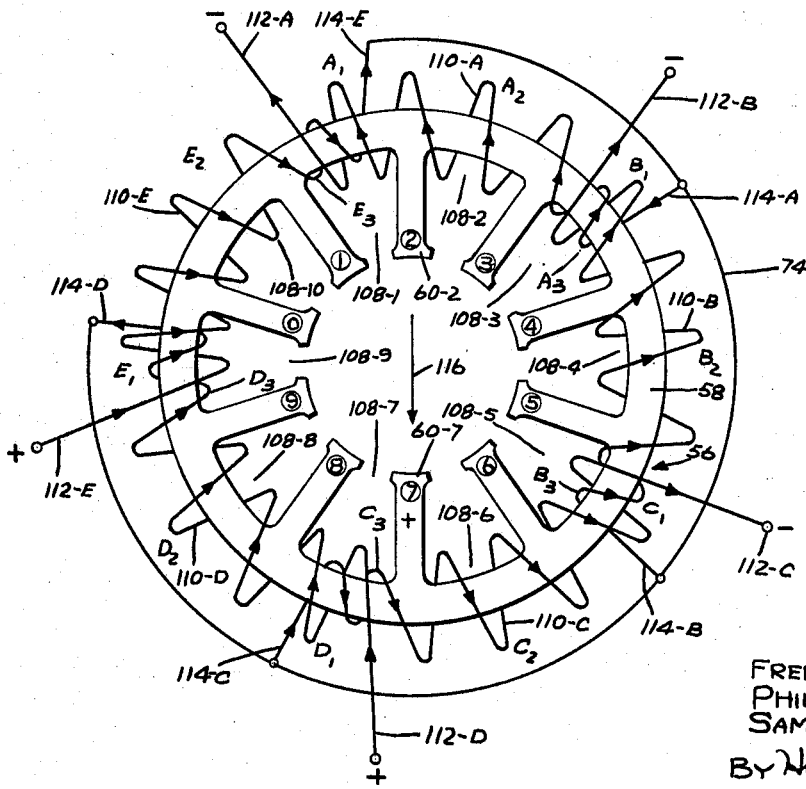
FIG. 8 is a chart showing a code which may be employed with the indicator shown in FIG. 6 for twelve rotor positions.
FIG. 9 is a schematic diagram showing another embodiment of the invention providing ten indicator positions.

Referring now to FIGS. 6, 7, and 8, in which like elements are indicated by like reference numerals, there is shown an electromagnetic indicator similar to that shown in FIGS. 1 through 5, but in which the stator core structure 56 is provided with twelve equally angularly spaced teeth or polar projections 60, and six winding sections or coils 70, the coils 70 again being equally angularly and symmetrically positioned on the teeth 60 and each again spanning five of the teeth or polar projections. In this system, the switching system 78 (not shown in FIG. 6) will include six single-pole, double-throw switches 80 having their movable contact elements 82 respectively coupled to the outer ends 76A through F of the coils 70, and having their stationary contacts 84 and 86 again respectively coupled to the positive and negative terminals 92 and 94, this arrangement thus providing twelve discrete magnetic orientations and thus positions for the permanent magnet rotor member 48.

In the embodiment of FIGS. 6 through 8, in each of the twelve positions of the switches 80, the outer ends 76 of a predetermined two or three of the coils are connected to one polarity side of the source with the outer ends 76 of the remaining four or three coils, as the case may be, being connected to the other polarity side of the source. It will again be observed by reference to FIGS. 7A and 7B, that in each of the twelve different switch positions, the sum of the currents flowing in the coils connected to the positive side of the source will be equal to the sum of the currents flowing in the coils connected to the negative side.

Referring particularly to FIG. 6 and to FIG. 7A, with the coils 70–A and 70–B connected to the positive terminal 92 and with the remaining coils 70–C through F connected to the negative terminal 94, it will be seen that equal and opposite MMF's are generated only in the diametrically opposite teeth 60–1 and 60–7, thus providing a magnetic orientation for the permanent magnet rotor member 48, as shown by the arrow 104. Likewise, it will be seen that with the coils 70–A, and 70–B, and 70–C connected to the positive terminal 92 and with the remaining coils 70–D, 70–E, and 70–F connected to the negative terminal 94, equal and opposite MMF's will be generated only in the diametrically opposite teeth 60–2 and 60–8, thus providing a new magnetic orientation for the permanent magnet rotor member, as shown by the dashed arrow 106.

Brief reference to FIG. 8 in conjunction with FIGS. 6 and 7 will show a code for the positions of the switching system 78 which will provide the twelve discrete read-out positions for the permanent magnet rotor member 48.

Figures 10, 11:
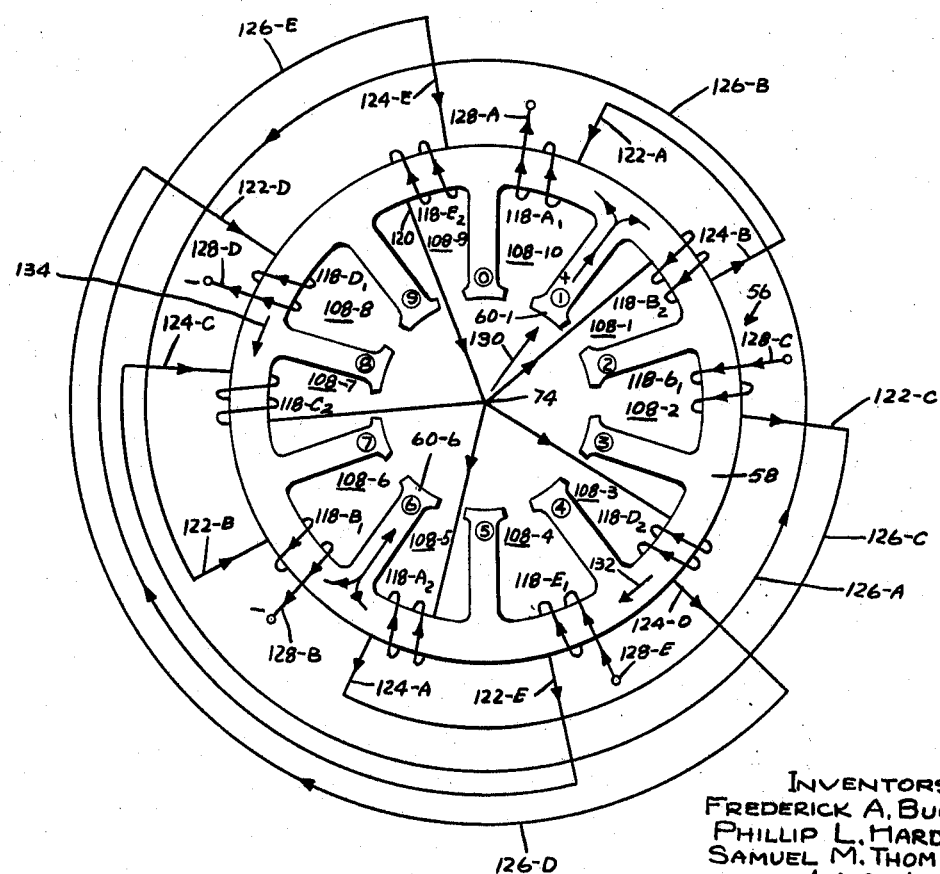
FIG. 10 is a chart showing a code which may be employed with the embodiment of FIG. 9.
FIG. 11 is a schematic diagram showing a further embodiment of the invention which provides ten indicator positions.

Referring now to FIGS. 9 and 10, there is shown a modified form of electromagnetic indicator in which the field winding sections or coils are positioned or wound in toroidal fashion on the yoke portion 58 of the core structure 56 rather than on the teeth or polar projections 60, as in the case of the previous embodiments. It will be seen that each adjacent pair of the teeth 60 defines a slot 108, there being ten teeth 60 and thus ten slots 108 in the embodiment shown in FIG. 9.

Here again, five field winding sections are provided, each comprising a single coil 110. The coils 110 are equally angularly and symmetrically positioned on the yoke portion 58, each coil having portions positioned in three of the slots 108. Thus, coil 110–A has a portion 110–A1 adjacent its end 112–A positioned in slot 108–1, a portion 110–A2 positioned in slot 108–2, and a portion 110–A3 adjacent its other end 114–A positioned in slot 108–3. Likewise, coil 110–B has its portion 110–B1 adjacent its end 112–B positioned in slot 108–3, its intermediate portion 110–B2 positioned in slot 108–4, and its portion 110–B3 adjacent its other end 114–B positioned in slot 108–5. It will thus be seen that each of the coils 110 has its first and third portions sharing a slot 108 with and thus overlapping the corresponding third and first portions of the adjacent coils 110.

The ends 114 of the coils 110 are interconnected, as at 74, and the ends 112 are brought out to make the external connections to the switching system 78, as shown in FIG. 3. As in the case of the embodiment of FIGS. 1 through 5, in each of the ten positions of the switches 80, the ends 112 of a preselected two of the coils 110 are connected to one polarity side of the source 96 with the ends 112 of the remaining three sections being connected to the opposite polarity side, the resultant equivalent circuit and division of current flow being the same as that shown in FIG. 4, i.e., the sum of the currents flowing in the two coils connected to one polarity side of the source being equal to the sum of the currents flowing in the remaining three coils connected to the opposite side, and the total current flow in the system drawn from the current source being constant in all positions of the switches 80.

Referring particularly to FIG. 9, it will be seen that with the ends 112–D and 112–E of the coils 110–D and 110–E respectively coupled to the positive terminal 92 and the ends 112–A, 112–B, and 112–C of the remaining three coils 110–A, 110–B, and 110–C connected to the negative terminal 94, equal and opposite MMF's will be generated only in the teeth 60–2 and 60–7, resulting in a discrete magnetic orientation for the rotor member 48 as shown by the arrow 116.

Brief reference to FIG. 10 will show a code for the positions of the switches 80 of the switching system 78 associated with the coils 110 which will provide the ten different discrete positions for the rotor member 48.

Figures 12, 13, 15:
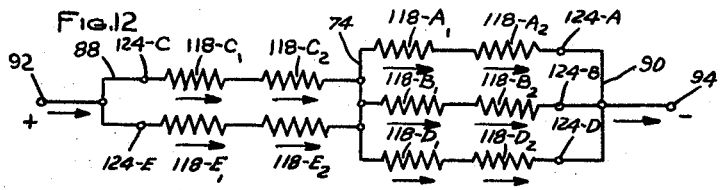
FIG. 12 is a schematic diagram showing the equivalent circuit for one of the positions of the indicator of FIG. 11.
FIG. 13 is a chart showing a code which may be employed with the indicator of FIG. 11.
FIG. 15 is a chart showing a code which may be employed with the indicator of FIG. 14.

Referring now to FIGS. 11, 12 and 13, another embodiment of the electromagnetic indicator of the invention is shown in which, again, the winding sections are positioned or wound upon the yoke section 58 of the core structure 56, each winding section in this embodiment comprising two separate coils positioned diametrically oppositely on the yoke portion. Here, yoke portion 58 of the stator core structure 56 again has ten teeth or polar projections 60 extending radially inwardly in equally angularly spaced relationship and defining slots 108 therebetween.

Field winding section 118–A comprises substantially identical coils 118–A1 and 118–A2 respectively positioned on the yoke portion 58 is diametrically opposite slots 108–10 and 108–5, the coils 118–A1 and 118–A2 being positioned or wound in the same sense so that current flow in the same direction therethrough will generate MMF's of the same polarity. Similarly, substantially identical coils 118–B1 and 118–B2 are positioned in the slots 108–6 and 108–1, the coils 118–C1 and 118–C2 are positioned in the slots 108–2 and 108–7, the coils 118–D1 and 118–D2 are positioned in the slots 108–8 and 108–3, and the coils 118–E1 and 118–E2 are positioned in the slots 108–4 and 108–9. Here, ends 120 of each of the coils 118–A2, 118–B2, 118–C2, 118–D2 and 118–E2 are interconnected at 74. Further, end 122–A of coil 118–A1 is connected to end 124–A of coil 118–A2, as at 126–A, and the ends 122 and 124 of the other pairs of coils 118 are similarly interconnected, as shown in FIG. 11. The remaining ends 128–A through E of the winding sections 118–A through E are respectively brought out for external connection to the switches 80 of the switching system 78 in the manner shown in FIG. 3.

It will now be observed that with the ends 128–C and 128–E of the winding sections 118–C (comprising coils 118–C1 and C2) and 118–E (comprising coils 118–E1 and E2) coupled by switches 80C and 80D to the positive terminal 92 of the source 96 and with the ends 128–A, D and B of the remaining winding sections 118–A (comprising the coils 118–A1 and A2), 118–D (comprising the coils 118–D1 and D2) and 118–B (comprising the coils 118–B1 and B2) coupled by the switches 80–A, 80–B and 80–E to the negative terminal 94 of the source 96, equal and opposite MMF's will be generated only in the diametrically opposite teeth 60–1 and 60–6 thus providing a discrete magnetic orientation for the permanent magnet rotor member 48, as shown by the arrow 130 in FIG. 11

It will further be seen that with this winding arrangement, there is no bucking or cancellation of the MMF's generated by any of the coils comprising the five winding sections, but on the contrary that the coils serve to force the flux in the yoke portion 58 in two parallel paths, as indicated by the arrows 132 and 134 so that substantially all of the flux, with the exception of leakage, is channeled or directed across the diametrically opposite teeth 60–1 and 60–6. Thus, in this embodiment, there is substantially complete utilization of the windings and, in turn, maximum efficiency.

Reference to FIG. 12 will reveal that the equivalent circuit of the coil connections shown in FIG. 11 is identical to that shown in FIG. 4, i.e., with the sum of the currents flowing in the two winding sections 118–C and 118–E which are connected to the positive terminal 92 being equal to the sum of the currents flowing in the remaining three winding sections 118–A, 118–B and 118–D which are connected to the negative terminal 94, the total current drain on the source 96 being constant for each switch position.

Reference to FIG. 13 will show a code which may be used with the switches 80 of the switching system 78 to provide the ten different discrete positions for the permanent magnet rotor 48 in the stator assembly of FIGS. 11 and 12.

Figure 14:
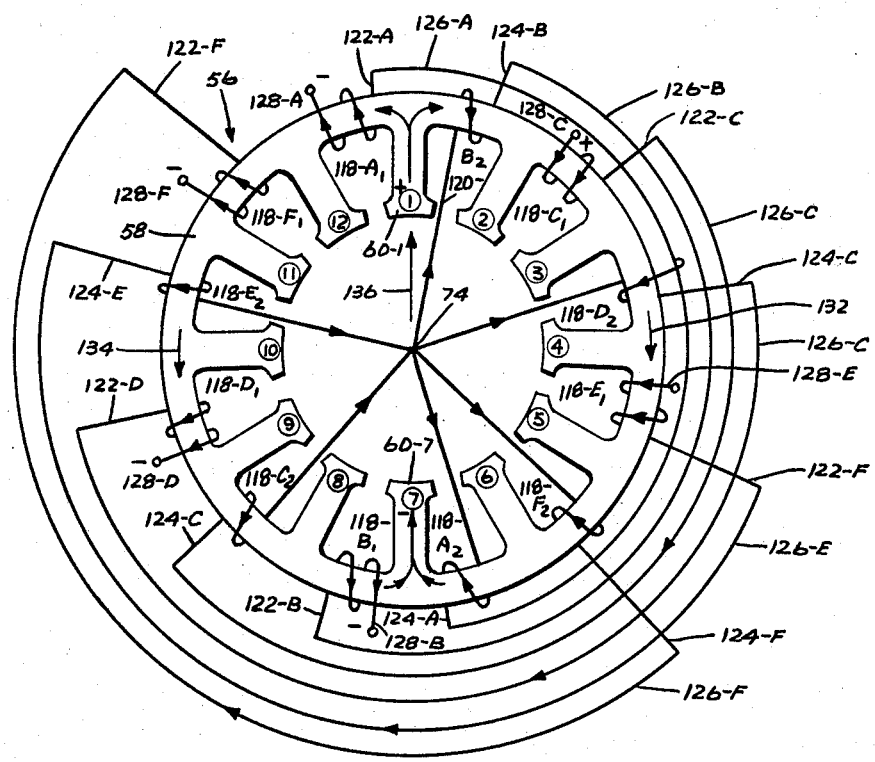
FIG. 14 is a schematic diagram of an indicator similar to that shown in FIG. 11, but providing twelve positions.

Referring now to FIGS. 14 and 15, there is shown a modification of the stator assembly of FIG. 11 in which the stator core structure 56 is provided with twelve teeth 60, there being six field winding sections each comprising two identical coils positioned diametrically oppositely on the yoke portion 58, this arrangement thus providing twelve discrete rotor positions.

In this embodiment, in common with the embodiment of FIG. 6, in each of the twelve positions of the switches 80 of the switching assembly 78, either two or three of the ends 128 of the winding sections 118 (each comprising two coils) are connected to one polarity side of the source while the remaining four or three winding sections (again each comprising two coils) are connected to the other polarity side of the source. Thus, referring to FIG. 14, with the ends 128-C and E of the winding sections 118-C and E (respectively comprising the coils 118-C1 and C2, and 118-E1 and E2) coupled to the positive terminal 92, and with the ends 128-A, B, D and F of the remaining winding sections 118-A, B, D ad F (each comprising two coils) coupled to the negative terminal 94, equal and opposite MMF's will be provided only in the teeth or polar projections 60-1 and 60-7 thus providing a discrete magnetic orientation for the permanent magnet rotor member 48 as shown by the arrow 136.

Brief reference to FIG. 15 will show a code for the positions of the switches 80 which will provide the twelve discrete rotational positions for the permanent magnet rotor member 48 associated with the stator assembly shown in FIG. 14.

While the illustrated embodiments provide ten or twelve discrete positions with five or six wire input, respectively, thus reducing computer interface, it will be readily understood that the invention is not so limited and that less than ten or more than twelve even-numbered discrete positions may be provided. Further while in the illustrated embodiments, the coils are shown as being symmetrically placed on or inserted in the stator core member, it will be understood that nonsymmetrical insertion may be employed. Also, while in the illustrated embodiments the stator core member is shown as having the same number of polar projections or teeth as the number of discrete rotor positions, it will be readily understood that it may have more teeth than positions. For example, the stator core member could be provided with five winding sections thus providing ten discrete positions, but have twelve polar projections or teeth.

It will aso be seen that in those embodiments in which the number of rotor positions divided by two is an odd integer, i.e., an odd number of winding sections is provided, the current consumption for the indicator is constant for all rotor positions. Finally, it is seen that in accordance with the invention, 100% utilization of the windings is provided since all of the windings are energized in each position of the rotor, thus increasing efficiency and reliability of the device and permitting reliable operation at a lower input power level.

While there have been described above the principles of this invention in connection with specific apparatus, it is to be clearly understood that this description is made only by way of example and not as a limitation to the scope of the invention.

What is claimed is:

1. A magnetic stator assembly of electromagnetic indicating apparatus for displaying a predetermined even number of discrete indicia in response to the characters of a prearranged code, said assembly comprising; a magnetic stator core structure having a yoke portion with at least said number of polar projections extending radially inwardly therefrom, said projections being equally angularly spaced around said yoke portion and having radially inner ends defining a bore for receiving a radially polarized permanent magnet rotor member mounted for rotation about an axis concentric with said bore; a plurality of substantially identical field winding sections equal in number to one-half said even number and each having first and second ends, said winding sections being positioned on said core structure in angularly displaced relationship, said first ends of all of said winding section being interconnected; a pair of electrical leads for connection respectively to the opposite polarity sides of a source of direct current potential; and switching means having said even number of positions for selectively coupling in each position thereof said second ends of at least two predetermined different ones of said winding sections to one of said leads and said second ends of the remaining winding sections to the other of said leads for simultaneous energization of all of said sections with polarities in accordance with said code, there being at least two of said remaining winding sections in each said switching means position, said predetermined different two of said winding sections having current flow therein in one predetermined direction and generating MMF's of one predetermined polarity in said core structure and said remaining winding sections having current flow therein in the opposite direction and generating MMF's of the opposite polarity in said core structure in each said switching means position whereby equal MMF values of opposite polarity are provided in a different pair of diametrically opposite polar projections in each of said switching means positions thereby providing said even number of discrete magnetic orientations for said rotor member.

2. The assembly of claim 1 wherein said winding sections are positioned on said polar projections.

3. The assembly of claim 1 wherein each of said winding sections comprises a single coil.

4. The assembly of claim 3 wherein said coils are distributed on said polar projections with each said coil spanning a plurality of said polar projections.

5. The assembly of claim 4 wherein said even number is ten, each said coil spanning five of said polar projections.

6. The assembly of claim 4 wherein said even number is twelve, each said coil spanning five of said polar projections.

7. The assembly of claim 3 wherein said coils are positioned on said yoke portion.

8. The assembly of claim 7 wherein each of said coils has portions respectively adjacent its said ends which respectively overlap the corresponding portions of its adjacent coils.

9. The assembly of claim 7 wherein said polar projections respectively define slots therebetween, each of said coils having portions respectively disposed in a plurality of adjacent slots, each of said coils having its portions respectively adjacent its said ends disposed in the same slots with the corresponding portions of the its adjacent coils.

10. The assembly of claim 9 wherein said even number is ten, each of said coils having said portions respectively disposed in three adjacent slots.

11. The assembly of claim 1 wherein each of said winding sections comprises two separately connected parts.

12. The assembly of claim 1 wherein said winding sections are positioned on said yoke portion.

13. The assembly of claim 12 wherein each of said winding sections comprises two serially connected parts respectively positioned diametrically oppositely on said yoke portion.

14. The assembly of claim 13 wherein each of said parts is positioned on said yoke portion between a respective pair of said polar projections.

15. The assembly of claim 14 wherein there is only one said winding section part between a respective pair of said polar projections.

16. The assembly of claim 15 wherein said even number is ten.

17. The assembly of claim 15 wherein said even number is twelve.

References Cited

UNITED STATES PATENTS

| | | | |
|---|---|---|---|
| 2,827,626 | 3/1958 | DeMolte | 340—347 |
| 2,009,140 | 11/1961 | Gordon | 340—319 |

(Other references on following page)

UNITED STATES PATENTS

| | | | |
|---|---|---|---|
| 3,042,819 | 7/1962 | Kennedy | 310—49 |
| 3,098,221 | 7/1963 | Propster | 340—324 |
| 3,113,301 | 12/1963 | Templin | 340—347 |
| 3,118,138 | 1/1964 | Milas et al. | 340—378 |
| 3,289,199 | 11/1966 | Watkins | 340—347 |
| 3,311,911 | 3/1967 | Pursiano | 340—378 |
| 3,350,709 | 10/1967 | Pursiano | 340—378 |
| 3,371,333 | 2/1968 | Naylor | 340—347 |
| 3,376,569 | 4/1968 | Watkins | 340—3 |

MAYNARD R. WILBUR, Primary Examiner

WM. J. KOPACY, Assistant Examiner

U.S. Cl. X.R.

340—378

PO-1050
(5/69)

UNITED STATES PATENT OFFICE
CERTIFICATE OF CORRECTION

Patent No. __3,478,349__         Dated __November 11, 1969__

Inventor(s) __Frederick A. Buuck, Phillip L. Harden, Samuel M. Thomas, Jr.__

It is certified that error appears in the above-identified patent and that said Letters Patent are hereby corrected as shown below:

SPECIFICATION

Column 6, line 26 "portions" should be --portion--.
Column 8, line 9 "is" should be --in--.
Column 9, line 15 "ad" should be --and--;
          line 43 "aso" should be --also--.

CLAIMS

Column 9, line 59 "of" should be --for--.
Column 10,
         line 53 "seperately" should be --serially--.

Signed and sealed this 7th day of July 1970.

(SEAL)
Attest:

EDWARD M. FLETCHER, JR.         WILLIAM E. SCHUYLER, JR.
Attesting Officer                 Commissioner of Patents